United States Patent [19]

Cady

[11] Patent Number: 4,572,318
[45] Date of Patent: Feb. 25, 1986

[54] FOUR-WHEEL DRIVE VEHICLE TRANSMISSION SYSTEM

[75] Inventor: John B. Cady, Hampton-in-Arden, Great Britain

[73] Assignee: Jaguar Cars Limited, Allesley, England

[21] Appl. No.: 618,355

[22] Filed: Jun. 7, 1984

[30] Foreign Application Priority Data

Jun. 8, 1983 [GB] United Kingdom ............... 8315747

[51] Int. Cl.$^4$ ........................................... B60K 17/344
[52] U.S. Cl. .................................... 180/248; 74/705; 74/710; 180/233
[58] Field of Search ............... 180/233, 234, 242, 245, 180/246, 248; 74/694, 700, 705, 710, 714

[56] References Cited

U.S. PATENT DOCUMENTS

| | | | |
|---|---|---|---|
| 4,018,317 | 4/1977 | Lemon | 180/233 |
| 4,103,753 | 8/1978 | Holdeman | 180/233 |
| 4,344,335 | 8/1982 | Kawai | 180/247 |
| 4,402,237 | 9/1983 | Tomlinson | 74/690 |
| 4,415,058 | 11/1983 | Suzuki | 180/247 |
| 4,441,575 | 4/1984 | Suzuki | 74/694 |
| 4,458,557 | 7/1984 | Hayakawa | 180/233 |

*Primary Examiner*—Stephen F. Husar
*Attorney, Agent, or Firm*—Thomas J. Greer, Jr.

[57] ABSTRACT

A transmission system especially useful in performance saloon cars includes a simple epicyclic gear (2) between an engine (1) and a standard gearbox (MG or AG). The drive to the front axle (10) is taken from the sun gear (12). The drive to the rear axle (20) is via the gearbox from the annulus (16). The torque splits in the optimum ratio between front and rear axles for the gear selected. In first gear and top gear the front:rear torque ratios are 1:3 and 3:2 respectively.

4 Claims, 1 Drawing Figure

U.S. Patent  Feb. 25, 1986  4,572,318
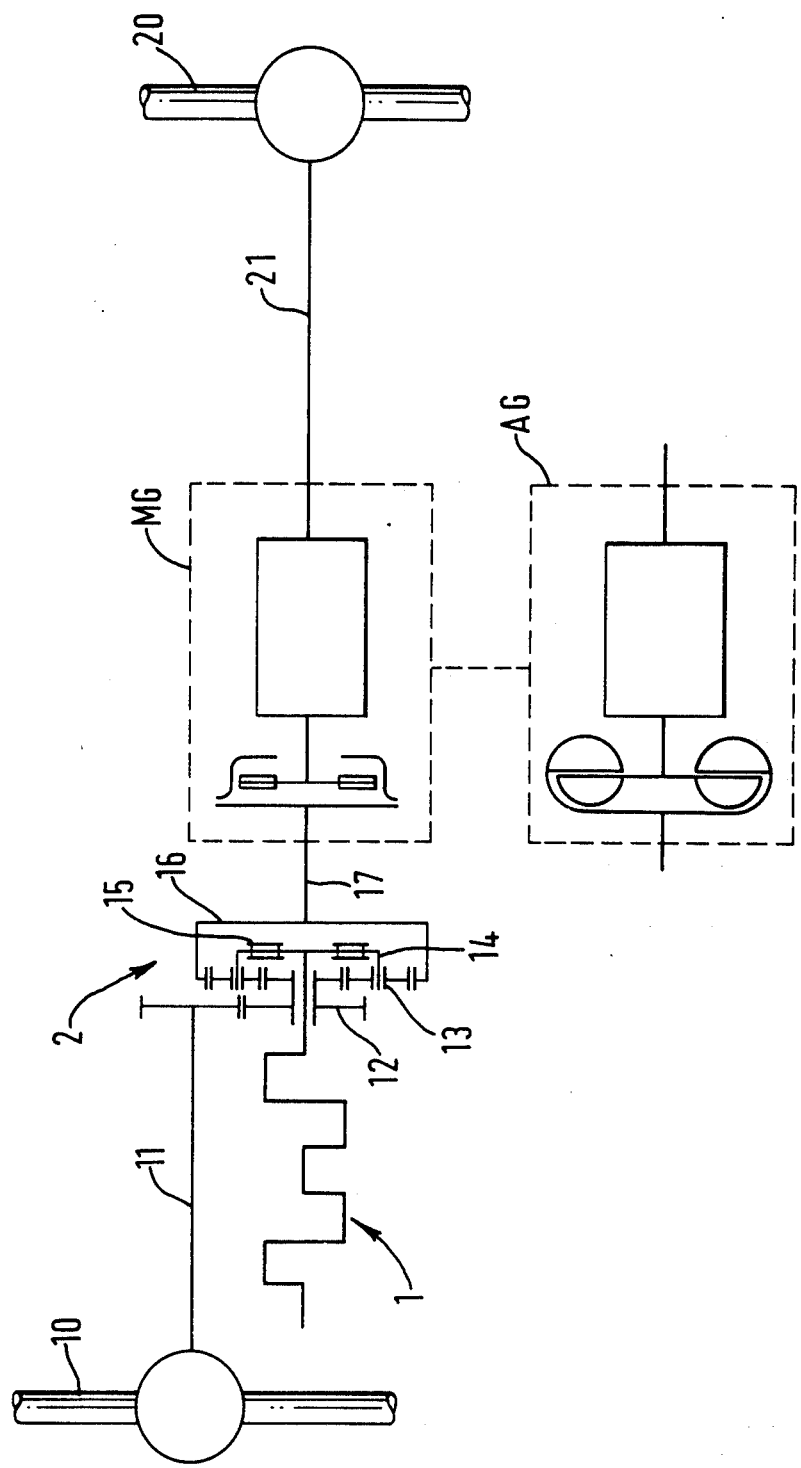

FOUR-WHEEL DRIVE VEHICLE TRANSMISSION SYSTEM

This invention relates to the transmission system for a four-wheel drive vehicle, and is particularly useful in a high-performance saloon car.

The invention consists in a four-wheel drive vehicle having an engine, front and rear axles and a gearbox, further including a simple epicyclic gear having as its input the drive from the engine, the drive to one axle being taken via the gearbox from a first output of the epicyclic gear, and the drive to the other axle being taken directly from a second output of the epicyclic gear.

In the preferred vehicle, the drive to the rear axle is taken via the gearbox. The preferred configuration is one in which the epicyclic gear comprises a sun gear, planetary gears with a planetary gear carrier, and an annulus, the carrier acting as the input connected to the engine, the annulus acting as the first output connected to drive the one axle via the gearbox, and the sun gear acting as the second output connected to drive the said other axle.

In order that the invention may be better understood, a preferred embodiment will now be described with reference to the accompanying schematic drawing showing a four-wheel drive transmission system with two alternative gearboxes and a simple epicyclic gear.

Referring now to the drawing, an engine 1 drives the planetary gear 13 carrier 14 of a simple epicyclic gear 2. Drive to the front axle 10 of the vehicle is taken by the prop shaft 11 from the sun gear 12. Drive to the rear axle 20 of the vehicle is taken from a conventional gearbox which may be manual (MG) or automatic (AG), the input 17 of the gearbox being driven by the annulus 16 of the simple epicyclic gear 2. To dampen the input from the engine 1, a torsional vibration damper 15 is mounted on the carrier 14. This damper is optional, and may be of the dampened mass or viscous type.

The torque split between front and rear axles, achieved at the simple epicyclic gear 2, is a function of the gear ratio selected in the gearbox (MG or AG). One effect of the epicyclic gear 2 is to provide a close ratio gearbox from a standard ratioed saloon car gearbox.

The torque splits, achieved by the epicyclic gear 2 in combination with the gearbox, are designed to be the optimum for the intended use of the vehicle. Table 1 below shows a typical example of one system, employing a five forward speed standard gearbox.

TABLE 1

| Gear | Ratio | Torque Split Front:Rear | Revs/min | Speed MPH | Effective Ratio | |
|---|---|---|---|---|---|---|
| 5 | .789 | 60:40 | 6000 | 152 | .90 | |
| 4 | 1.0 | 54:46 | 6500 | 141 | 1.05 | |
| 3 | 1.396 | 46:54 | 6500 | 111 | 1.33 | 2.98:1 ratio spread |
| 2 | 2.087 | 36:64 | 6500 | 82 | 1.82 | |
| 1 | 3.32 | 26:74 | 6500 | 55 | 2.68 | |

The torque split in gear 1, first gear, of about 1:3 maximises traction in proportion to dynamic weight transfer. The split of about 3:2 in top gear gives stability at speed. Selection of an intermediate gear gives the optimum torque split for starting the vehicle on a slippery surface. It will also be appreciated that the high torque ratio given to the rear axle in low gears facilitates throttle steering around low-speed bends.

An advantage of the splitting of the torque is that it is possible to use a lighter-rated standard transmission; for example a 77 mm transmission can be rated against a 310 lb ft (4.4 Nm) engine. Moreover, lightweight front axle and drive shaft componentry can be used, since only a fraction (e.g. 63%) of the maximum engine torque is transmitted to the front axle; this also results in less torque reaction through the steering.

The invention has been described in the context of saloon cars, but other four wheel drive motor vehicles could incorporate the invention.

What is claimed is:

1. In a four-wheel drive vehicle having an engine and front and rear driving axles, a power transmission means from said engine to said axles comprising an epicyclic gear set having an input and first and second outputs and a variable ratio gearbox, a first driving connection from said engine to said epicyclic gear set input, a second driving connection from said second output to said front axle, a third driving connection from said first output to said gearbox and a fourth driving connection from said gearbox to said rear axle.

2. A power transmission means according to claim 1, wherein the epicyclic gear set comprises a sun gear, planetary gears with a planetary gear carrier, and an annulus, the carrier acting as the input connected to the engine, the annulus acting as the first output connected to drive the rear axle via the gearbox, and the sun gear acting as the second output connected to drive the front axle.

3. A power transmission means according to claim 1, wherein the gearbox ratios are such that selection of one forward gear gives a front: rear axle torque split of substantially 1:3, and selection of another forward gear gives a front: rear axle torque split of substantially 3:2.

4. A power transmission means according to claim 1, wherein the simple epicyclic gear comprises a torsional damper coupled to the planetary gear carrier.

* * * * *